(12) United States Patent
Albrecht et al.

(10) Patent No.: US 8,054,847 B2
(45) Date of Patent: Nov. 8, 2011

(54) BUFFER MANAGEMENT IN A NETWORK DEVICE

(75) Inventors: Alan R. Albrecht, Roseville, CA (US); Stuart Johnston, El Dorado, CA (US); Bruce E. LaVigne, Roseville, CA (US); Jonathan M. Watts, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 629 days.

(21) Appl. No.: 11/591,167

(22) Filed: Oct. 31, 2006

(65) Prior Publication Data

US 2008/0101226 A1   May 1, 2008

(51) Int. Cl.
*H04L 12/28* (2006.01)
*H04L 12/56* (2006.01)

(52) U.S. Cl. ........................................... 370/412

(58) Field of Classification Search .................. 370/349, 370/412–418, 473, 474
See application file for complete search history.

(56) References Cited

U.S. PATENT DOCUMENTS

| | | | | |
|---|---|---|---|---|
| 4,849,968 A | * | 7/1989 | Turner | 370/232 |
| 5,231,633 A | * | 7/1993 | Hluchyj et al. | 370/429 |
| 5,764,641 A | * | 6/1998 | Lin | 370/412 |
| 5,812,525 A | * | 9/1998 | Teraslinna | 370/229 |
| 5,838,681 A | * | 11/1998 | Bonomi et al. | 370/395.41 |
| 6,092,115 A | * | 7/2000 | Choudhury et al. | 709/235 |
| 6,434,361 B1 | * | 8/2002 | Carrozza et al. | 455/13.2 |
| 6,829,649 B1 | * | 12/2004 | Shorey et al. | 709/235 |
| 7,149,187 B1 | * | 12/2006 | Jacobson et al. | 370/235 |
| 7,298,728 B2 | * | 11/2007 | Golla et al. | 370/347 |
| 7,382,749 B2 | * | 6/2008 | Yam | 370/331 |
| 2004/0003069 A1 | * | 1/2004 | Wong | 709/223 |
| 2004/0105393 A1 | * | 6/2004 | Ronneke et al. | 370/252 |
| 2004/0233845 A1 | * | 11/2004 | Jeong et al. | 370/230 |
| 2005/0105532 A1 | * | 5/2005 | Yun et al. | 370/395.21 |
| 2005/0163107 A1 | * | 7/2005 | Gunturi et al. | 370/352 |
| 2006/0026294 A1 | * | 2/2006 | Virdi et al. | 709/232 |
| 2006/0268871 A1 | * | 11/2006 | Van Zijst | 370/390 |
| 2007/0201365 A1 | * | 8/2007 | Skoog et al. | 370/230.1 |

\* cited by examiner

*Primary Examiner* — Chirag Shah
*Assistant Examiner* — Minh-Trang Nguyen

(57) ABSTRACT

Buffer management in a network device. A new data packet is received at a packet buffer queue of the network switch, wherein the new data packet is a portion of a burst block. If the packet buffer queue is full, a data packet from within the packet buffer queue that is not a last sequential data packet of a burst block is dropped.

13 Claims, 5 Drawing Sheets

300

Receive a new data packet at a packet buffer queue of the network switch, wherein the new data packet is a portion of a burst block
310

Is the packet buffer queue full?
320 — No →

↓ Yes

Drop a data packet from within the packet buffer queue that is not a last sequential data packet of the burst block
330

- Drop last sequential data packet of the packet buffer queue
  332

- Drop second from last sequential data packet of the packet buffer queue
  334

- Drop first sequential data packet of the packet buffer queue
  336

Buffer the new data packet at the packet buffer queue
340

Figure 3

BUFFER MANAGEMENT IN A NETWORK DEVICE

FIELD

Embodiments of the present invention relate to the field of data networks.

BACKGROUND ART

Recent technological advances have enabled increasingly higher network bandwidths. In order to fully utilize the increased network bandwidth, block-oriented protocols continue to increase the amount of data sent at a time. For example, the amount of data transmitted within a burst block has increased significantly. Moreover, these higher network bandwidths are reducing the packet buffer sizes in network switches because the packet buffers must be very fast to support the higher network bandwidths. To provide fast access, the packet buffers are often placed directly inside the network switch chip, in close proximity to the packet processing. Since there is limited space and thus limited available memory on these chips, packet buffer sizes have significantly reduced. Either of these two factors, increased data block size or reduced packet buffer size, can significantly negatively impact network performance. For example, the potential for data packets being dropped is increased because the data packets may be received in a burst and do not fit within the available packet buffer space. This is especially true if the incoming link has a higher data rate than the outgoing link (e.g. a 1 Gb/s server feeding a 100 Mb/s desktop), so the block burst cannot be just passed through, but must be buffered up to be transmitted at the lower data rate.

Data transfer protocols, such as Transmission Control Protocol (TCP), provide mechanisms for managing dropped packets. TCP is able to notify a sender of a dropped packet upon the receipt of the next two sequential packets in the burst block (TCP is stream-oriented, not block-oriented). The sender will then retransmit the dropped packet, so the receiver will not lose any packet data. Other data transfer protocols provide similar mechanisms for managing packets dropped from the beginning or middle of a burst block.

However, acknowledgement mechanisms for data packets dropped from the end of a burst block are typically very slow. For example, TCP behaves such that when one of the last two packets of a burst is lost there is a much greater delay to recover than when any other packet in the burst is lost. Since there are not two packets of the burst block following either of the last two packets, there is no quick mechanism to notify the sender of a dropped packet. If one of the last two packets is dropped, the destination and sender assume the packet was delayed, and wait for a timeout to occur before resending the packet. A timeout may take a very long time to happen, e.g., on the order of seconds. As a result of waiting for the timeout before resending, network performance drops precipitously. Dropping the last packet or packets of a burst is a performance issue because the acknowledgment mechanism is typically very slow to recover from these packet losses.

Current mechanisms for managing how incoming packets are dropped from a filled packet buffer can exacerbate the drop in network performance. One such mechanism, tail dropping, drops all incoming packets if the packet buffer is full. This is very likely to result in dropping packets at the end of the burst block, the very packets which take the longest to be resent.

Another mechanism, random early drop (RED) attempts to improve on tail dropping by randomly dropping packets from within the packet buffer to make room for potential new packets, thus attempting to reduce the traffic load by causing TCP backoff mechanisms to engage. This scheme may drop earlier packets, but still has a reasonable chance that the last packet of a burst is dropped as it does not differentiate its drops across the burst. There are many variants of RED, such as Weighted Random Early Discard (WRED), REM, DRED, BLUE, etc., all of which drop packets without distinction of location within a burst. Schemes that drop the last packet with equal probability to any other packet are vulnerable to significant performance impacts from the lost final packets.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 is a flow chart illustrating a process of buffer management in a network device, in accordance with an embodiment of the present invention.

Figure 1:
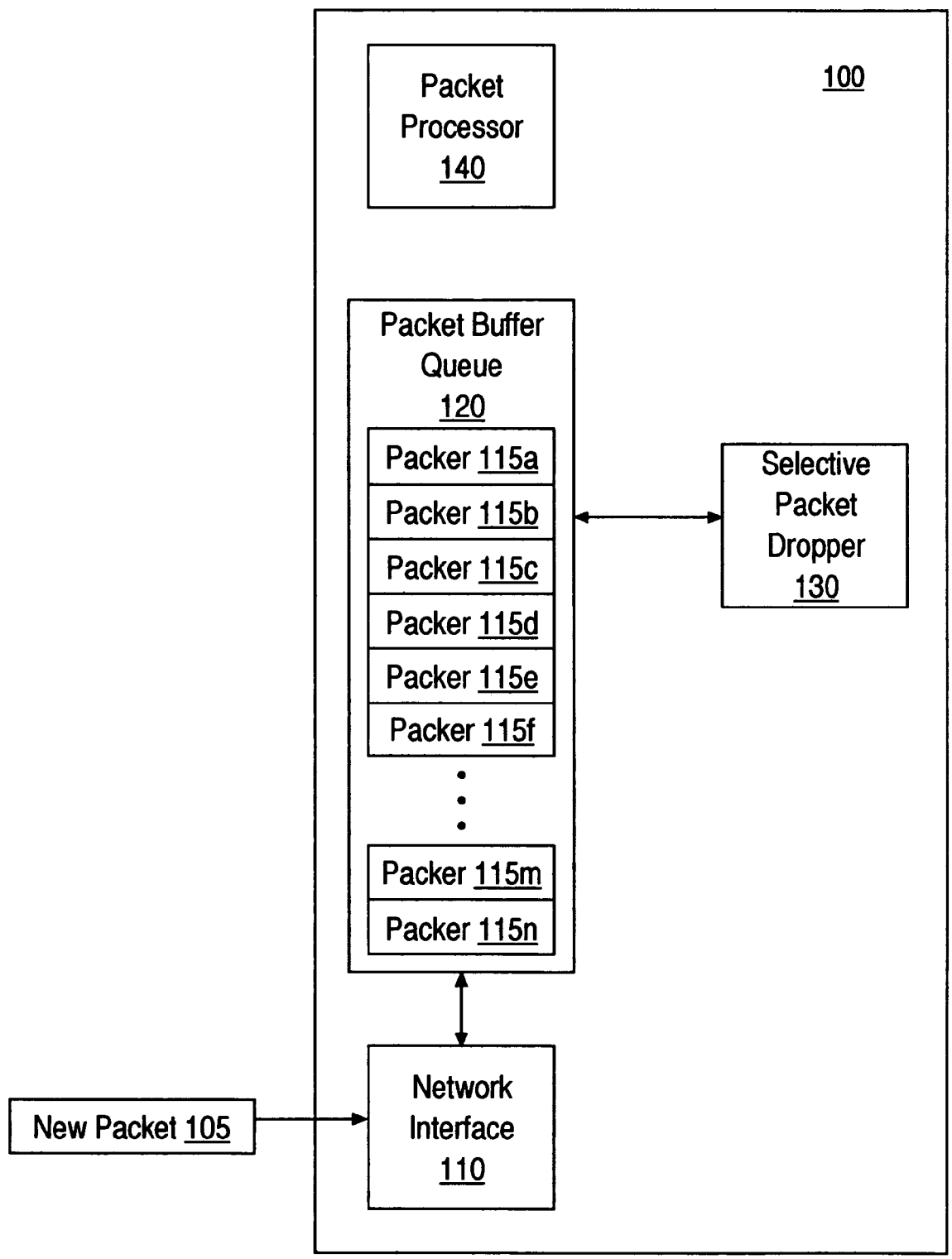
FIG. 1 is a block diagram illustrating a network device, in accordance with an embodiment of the present invention.

The drawings referred to in this description should not be understood as being drawn to scale except if specifically noted.

DESCRIPTION OF THE EMBODIMENTS

Various embodiments of the present invention, a method of buffer management in a network device, are described herein. In one embodiment, a new data packet is received at a packet buffer queue of the network switch, wherein the new data packet is a portion of a burst block. If the packet buffer queue is full, a data packet from within the packet buffer queue that is not a last sequential data packet of a burst block is dropped.

In another embodiment, a new data packet is received at a packet buffer queue of the network switch. If the packet buffer queue is full, it is determined whether the new data packet includes an indication that the data packet should not be dropped from the packet buffer queue. The new data packet is selectively buffered based on whether the new data packet includes the indication that the data packet should not be dropped from the packet buffer queue.

Reference will now be made in detail to the various embodiments of the invention, examples of which are illustrated in the accompanying drawings. While embodiments of the invention will be described in conjunction with the various embodiments, it will be understood that they are not intended to limit the invention to these embodiments. On the contrary, embodiments of the invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

Various embodiments of the present invention, a method of buffer management in a network device, are described herein. Embodiments of the present invention provide a method and device thereof for selectively dropping packets from a data packet buffer queue. If the data packet buffer queue of a network device is full, embodiments of the present invention provide for dropping a data packet from within the data packet buffer queue that is not a data packet that significantly impacts the performance of the network to the application sending the burst block. In one embodiment, a packet is not dropped if the packet is the last sequential data packet of a burst block. In various embodiments, a determination as to whether a data packet is dropped from the packet buffer queue based on a position of the data packet within the packet buffer queue. In other various embodiments, a determination as to whether a data packet is dropped from the packet buffer queue based on contents of the data packet itself.

Network Device in Accordance with Embodiments of the Present Invention

FIG. 1 is a block diagram illustrating a network device 100, in accordance with an embodiment of the present invention. In one embodiment, network device 100 is a network switch. Network device 100 includes network interface 110, packet buffer queue 120, selective packet dropper 130, and packet processor 140. It should be appreciated that network device 100 may include additional components that are not shown so as to not unnecessarily obscure aspects of the embodiments of the present invention.

Network interface 110 is configured to receive incoming data packets, e.g., new data packet 105. In the described embodiment, new data packet 105 is a data packet of a burst block. For example, a burst block may include 64 kilobytes (kb) of data, segmented as 32 separate 2 kb data packets. Network interface 110 is communicatively coupled to packet buffer queue 120 and is configured to forward incoming data packets to packet buffer queue 120 for buffering.

Packet buffer queue 120 is configured to buffer a plurality of data packets. It should be appreciated that packet buffer queue 120 may be operable to buffer any size and any number of data packets, e.g., 16 data packets or 32 data packets. As shown, packet buffer queue 120 includes capacity for packets 115a-115n, where n is any positive integer. It should be appreciated that packet buffer queue 120 may be made up of packets of multiple burst blocks.

Packet buffer queue 120 is operable to receive new packet 105 from network interface 110. In accordance with the present embodiment of the present invention for descriptive purposes, packet buffer queue 120 is full or nearly full and does not have additional capacity for buffering new packet 105. In order to optimize the performance of the network to the application sending the burst block, network device 100 is operable to drop data packets from packet buffer queue 120 to make room for new data packet 105. In general, the various embodiments of the present invention are operable to drop those packets from within packet buffer queue 120 that do not significantly negatively impact the performance of the network to the application sending the burst block. In one embodiment, this is accomplished by dropping a data packet from packet buffer queue 120 if the data packet is not the last data packet of a burst block. In another embodiment, a data packet is dropped from packet buffer queue 120 if the data packet is not one of the last two data packets of a burst block.

It should be appreciated that different transmission protocols, e.g., Transmission Control Protocol (TCP), NFS, or NetBIOS, may require different numbers of data packets following a dropped data packet to quickly activate an acknowledgement mechanism that automatically requests the sender resend a dropped packet. For example, current versions of TCP typically requires that the two following sequential packets are received before a request is sent for the sender to resend the dropped packet without waiting for a timeout event. Therefore, for TCP, if either of the last packet or next to last packet of a burst block is dropped, a timeout is required for a resend request to be sent to the sender. Dropped packets requiring a timeout prior to sending a request for resending the dropped packet significantly decrease the performance of the network to applications sending burst blocks.

Accordingly, selective packet dropper 130 is configured to select and drop a packet from within packet buffer queue 120 that does not require a timeout in order to request that the dropped packet be resent. In one embodiment, this is accomplished by ensuring that the packet dropped from within packet buffer queue 120 is not the last packet of a burst block. In another embodiment, this is accomplished by ensuring that the packet dropped from within packet buffer queue 120 is not the last two or more packets of a burst block. For example, for TCP transfers, the last two packets of a burst block are not dropped from packet buffer queue 120. However, it should be appreciated that any number of data packets at the end of a burst block are not dropped, according to the protocol used for transferring the data packets.

Packet processor 140 is configured to process packets received from the packet buffer queue 120. In general, packet processor 140 is configured to perform data packet processing and forwarding functionality, as understood by those of skill in the art. The operational details of packet processor 140 are not described herein so as not to unnecessarily obscure aspects of the embodiments of the present invention.

Selectively Dropping a Data Packet Based on the Sequential Location Within the Packet Buffer Queue Various embodiments of the present invention select and drop a data packet from within packet buffer queue 120 based on the sequential placement of the packet within packet buffer queue 120. In one embodiment, data packets are placed sequentially within packet buffer queue 120 according to the time of arrival. In other words, the most recently received data packet is the last sequential packet, e.g., packet 115n. Similarly, the earliest received data packet within packet buffer queue 120 is the first sequential packet, e.g., packet 115a. By implication the last packet is the packet that does not have another packet following it. It should be appreciated that packet buffer queue 120 may include at least one packet not relating to the burst block of new data packet 105. The following embodiments select and drop a packet or packets for packet buffer queue 120 based on the time of arrival of the packet to ensure that the last packet of a burst is not dropped.

In one embodiment, selective packet dropper 130 is configured to drop the last sequential data packet or packets of the plurality of data packets 115a-115n from within packet buffer queue 120. For instance, selective packet dropper 130 is configured to drop packet 115n. In one embodiment, selective packet dropper 130 is also configured to drop at least one packet immediately preceding data packet 115n, e.g., packet 115m. By dropping the last sequential data packet or packets, packet buffer queue 120 is able to buffer new data packet 105 and ensure that a timeout is not required for sending a request to resend the dropped packet or packets in protocols where only one following packet is required for automatically generating the packet resend request.

In another embodiment, selective packet dropper 130 is configured to drop the second from last sequential data packet or packets of the plurality of data packets 115a-115n from within packet buffer queue 120. For instance, selective packet dropper 130 is configured to drop packet 115m. In one embodiment, selective packet dropper 130 is also configured to drop at least one packet immediately preceding data packet 115m. By dropping the second from last sequential data packet or packets, packet buffer queue 120 is able to buffer new data packet 105 while not dropping packet 115n, and ensure that a timeout is not required for sending a request to resend packet 115m in protocols where the following two packets are required for automatically generating the packet resend request, such as current versions of TCP.

In another embodiment, selective packet dropper 130 is configured to drop first sequential data packet or packets 115a of the plurality of data packets 115a-115n from within packet buffer queue 120. It should be appreciated that selective packet dropper 130 may be configured to selectively drop any packet or set of packets from within packet buffer queue 120.

Selectively Dropping a Data Packet Based on the Contents of the Data Packet

Other embodiments of the present invention select and drop a data packet or packets from within packet buffer queue 120 based on the contents of the data packet(s) itself. Selective packet dropper 130 is configured to select a data packet or packets from within packet buffer queue 120. In one embodiment, selective packet dropper 130 randomly selects a packet or packets from within packet buffer queue 120. In another embodiment, selective packet dropper 130 selects a packet or packets from within packet buffer queue 120 according to a predetermined sequence. For example, a packet in a specific sequential placement of packet buffer queue 120 is selected, such as the first sequential packet, the last sequential packet, or another sequential packet. Rather than dropping a packet based on the position within packet buffer queue 120, various embodiments of the present invention select packets to drop based on the contents of the packets, and independent of the position of the packet within packet buffer queue 120.

Figure 2:
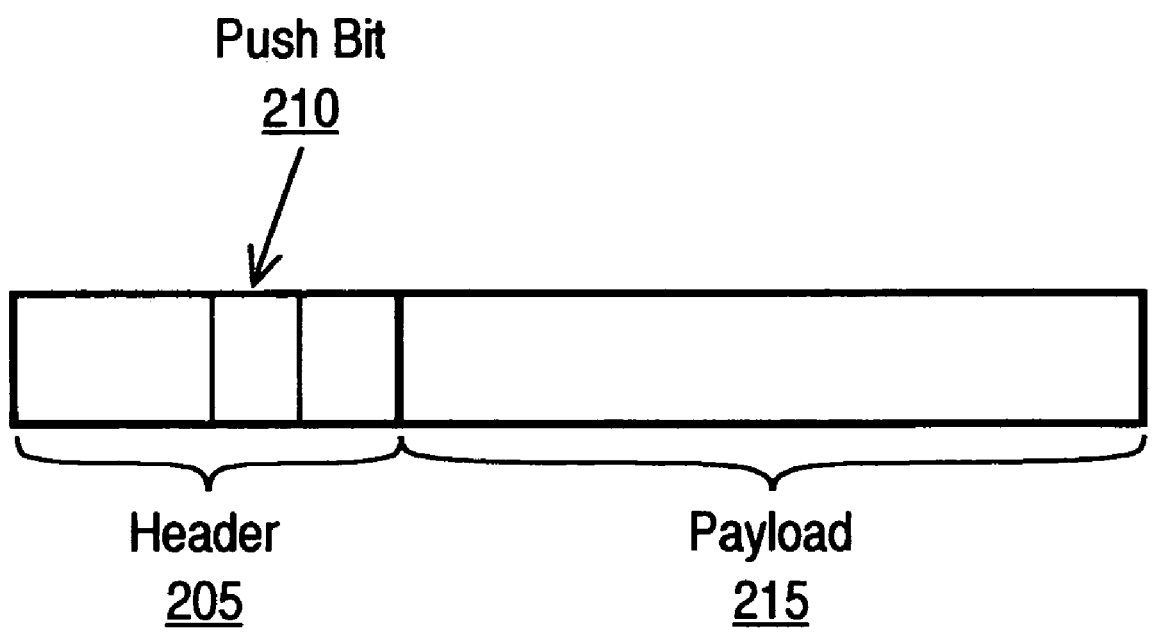
FIG. 2 is a block diagram of an example data packet comprising a push indicator, in accordance with an embodiment of the present invention.

In the present embodiments, selective packet dropper 130 is also configured to determine whether the data packet includes an indication that the data packet should not be dropped from packet buffer queue 120. In one embodiment, the header of a data packet includes such an indication. FIG. 2 is a block diagram of an example data packet 200 comprising a push bit 210, in accordance with an embodiment of the present invention. Data packet 200 includes header 205 and payload 215. Within header 205 is a push bit 210. For example, a TCP header includes a PSH bit. In one embodiment, the push bit is set by the sender to indicate that the last packet in a burst block. Dropping such a packet would cause a decrease in performance. In one embodiment, due to the interaction of SMB with TCP, SMB will always stop sending data at the end of a burst block, and TCP will always set the push bit on the last packet of that block. The performance of SMB and TCP allows for the inference that a SMB packet with the PSH bit set is the last packet in a burst block, and thus should not be dropped. Accordingly, in one embodiment, the PSH bit is an indication that the data packet should not be dropped.

The push bit tells the receiving device to forward all buffered data up the protocol stack to the receiving application without waiting for more data. The push bit, while not directly defined by the TCP standard as the last packet of a burst block, is a good indicator that the packet is the last packet of a burst block. Moreover, it should be appreciated that a packet that is not the last packet of a burst block can include a push bit. For example, other applications such as telnet set the push bit on any packets containing data typed by the user.

Selective packet dropper 130 is configured to drop the selected packet or packets from packet buffer queue 120 if the data packet(s) do(es) not comprise an indication that the data packet should not be dropped from packet buffer queue 120. In one embodiment, the indication is a push bit. In other words, selective packet dropper 130 will not drop a packet from packet buffer queue 120 if the push bit of the packet is set, e.g., the TCP PSH bit is set to one. Selective packet dropper 130 will then select another packet from packet buffer queue 120, and determine whether the next packet includes an indication that the data packet should not be dropped.

Buffer Management in Accordance with Embodiments of the Present Invention

FIG. 3 is a flow chart illustrating a process 300 of buffer management in a network device, in accordance with an embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in process 300, such steps are examples. That is, the embodiments of the present invention are well suited to performing various other steps or variations of the steps recited in FIG. 3. In one embodiment, process 300 is performed by network device 100 of FIG. 1.

At step 310 of process 300, a new data packet (e.g., new packet 105 of FIG. 1) is received at a packet buffer queue (e.g., packet buffer queue 120 of FIG. 1) of a network switch, wherein the new data packet is a portion of a burst block.

At step 320, it is determined whether the packet buffer queue is full. In one embodiment, this determination is based on whether the amount of data in the packet buffer queue exceeds a threshold. For example, when the amount of data, e.g. number of packets, exceeds a threshold, the packet buffer queue is determined to be full. It should be appreciated that the packet buffer queue need not be completely full for a determination that the packet buffer queue is full. In another embodiment, the packet buffer queue is determined to be full if there is no room to receive additional packets. If it is determined that the packet buffer queue is not full, process 300 proceeds to step 340, where the new data packet is buffered at the packet buffer queue. Alternatively, if it is determined that the packet buffer queue is full, process 300 proceeds to step 330.

At step 330, a data packet or packets from within the packet buffer queue is dropped, wherein the dropped data packet or packets are not the last sequential data packet(s) of a burst block. In one embodiment, step 330 is performed by a selective packet dropper of the network device, e.g., selective packet dropper 130 of FIG. 1). In various embodiments, a determination is made whether the data packet or packets are the last sequential data packet(s) of a burst block based on a position of the data packet(s) within the packet buffer queue. Steps 332, 334 and 336 describe different embodiments of dropping a data packet(s) based on the placement of the data packet(s) in the queue, e.g., based on the order in which the data packets were received.

In one embodiment, as shown at step 332, the last sequential data packet or packets (e.g., packet 115n of FIG. 1) is dropped from within the packet buffer queue. In another embodiment, as shown at step 334, the second from last sequential data packet or packets (e.g., packet 115m of FIG. 1) is dropped from within the packet buffer queue. In another embodiment, the first sequential data packet or packets (e.g., packet 115a of FIG. 1) is dropped from within the packet buffer queue. It should be appreciated that steps 332, 334 and 336 illustrate different embodiments of dropping a packet or packets based on the sequential position of the packet(s) within the packet buffer queue. It should be appreciated that embodiments of the present invention are not limited to the described embodiments, and that any sequential position can be used for selecting a packet or packets to drop.

Figure 4:
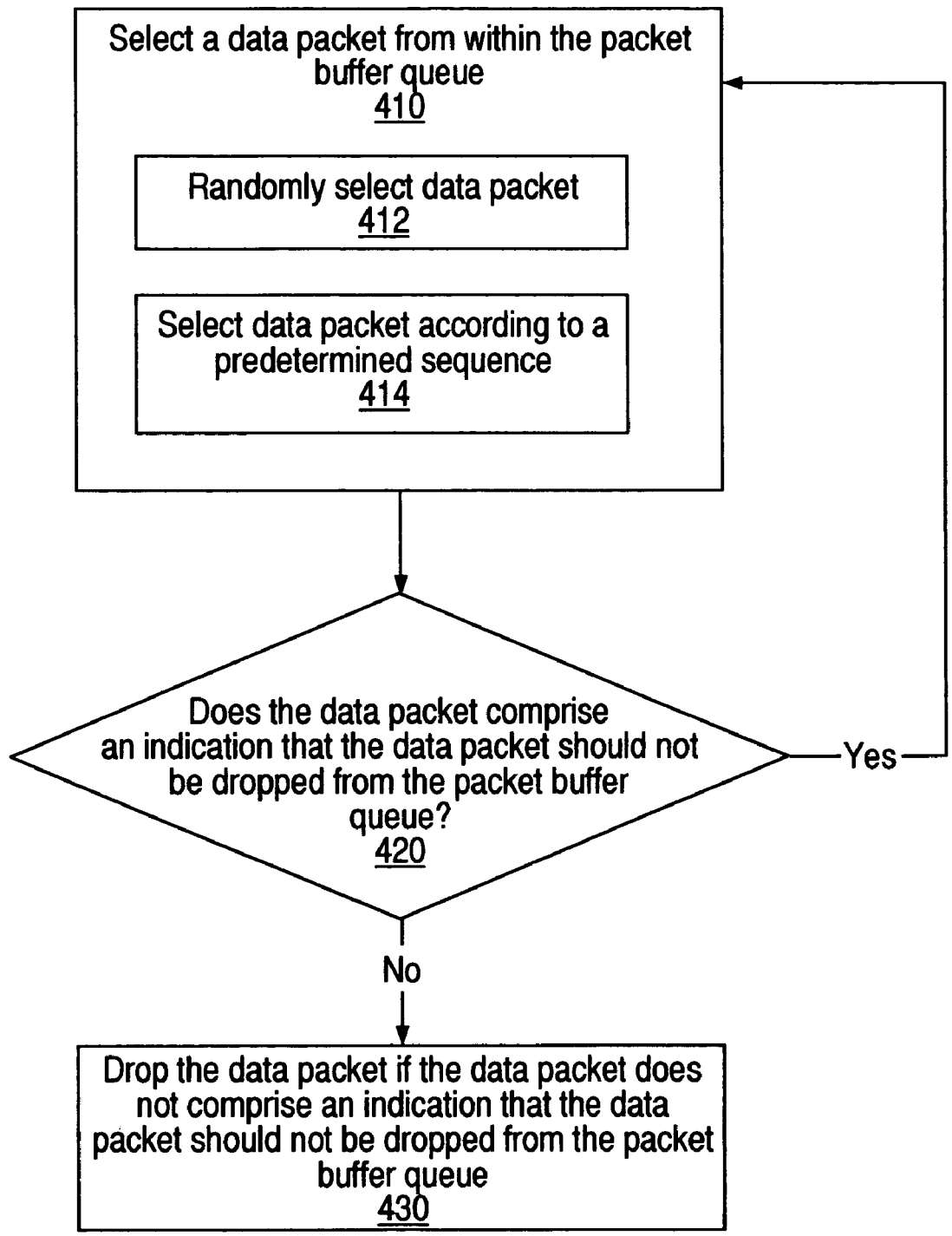
FIG. 4 is a flow chart illustrating a process for dropping a data packet from a data packet queue based on contents of the data packet, in accordance with an embodiment of the present invention.

In other various embodiments, step 330 is performed according to the determination as to whether a packet is dropped is based on the contents of the data packet itself. FIG. 4 is a flow chart illustrating a process 400 for dropping a data packet from a data packet queue based on contents of the data packet, in accordance with an embodiment of the present invention. It should be appreciated that various embodiments of step 330 can be performed according to any of steps 332, 334 and 336 of FIG. 3 and process 400 of FIG. 4.

At step 410, a data packet is selected from within the packet buffer queue. In one embodiment, as shown at step 412, the packet is selected randomly. In another embodiment, as shown at step 414, the packet is selected according to a predetermined sequence. For example, a packet in a specific sequential placement of the packet buffer queue is selected, such as the first sequential packet, the last sequential packet, or another sequential packet.

At step 420, it is determined whether the data packet includes an indication that the data packet should not be dropped from the packet buffer queue. In one embodiment, the indication is a push bit indication. If it is determined that the data packet includes an indication that the data packet should not be dropped, process 400 returns to step 410 where another data packet is selected. Alternatively, if it is determined that the data packet does not comprise an indication that the data packet should not be dropped, process 400 proceeds to step 430.

At step 430, the data packet is dropped because the data packet does not comprise an indication that the data packet should not be dropped from the packet buffer queue. After step 430, process 400 ends and process 300 of FIG. 3 proceeds to step 340.

With reference to FIG. 3, in one embodiment of the present invention shown at step 340, the new data packet is buffered at the packet buffer queue.

Figure 5:
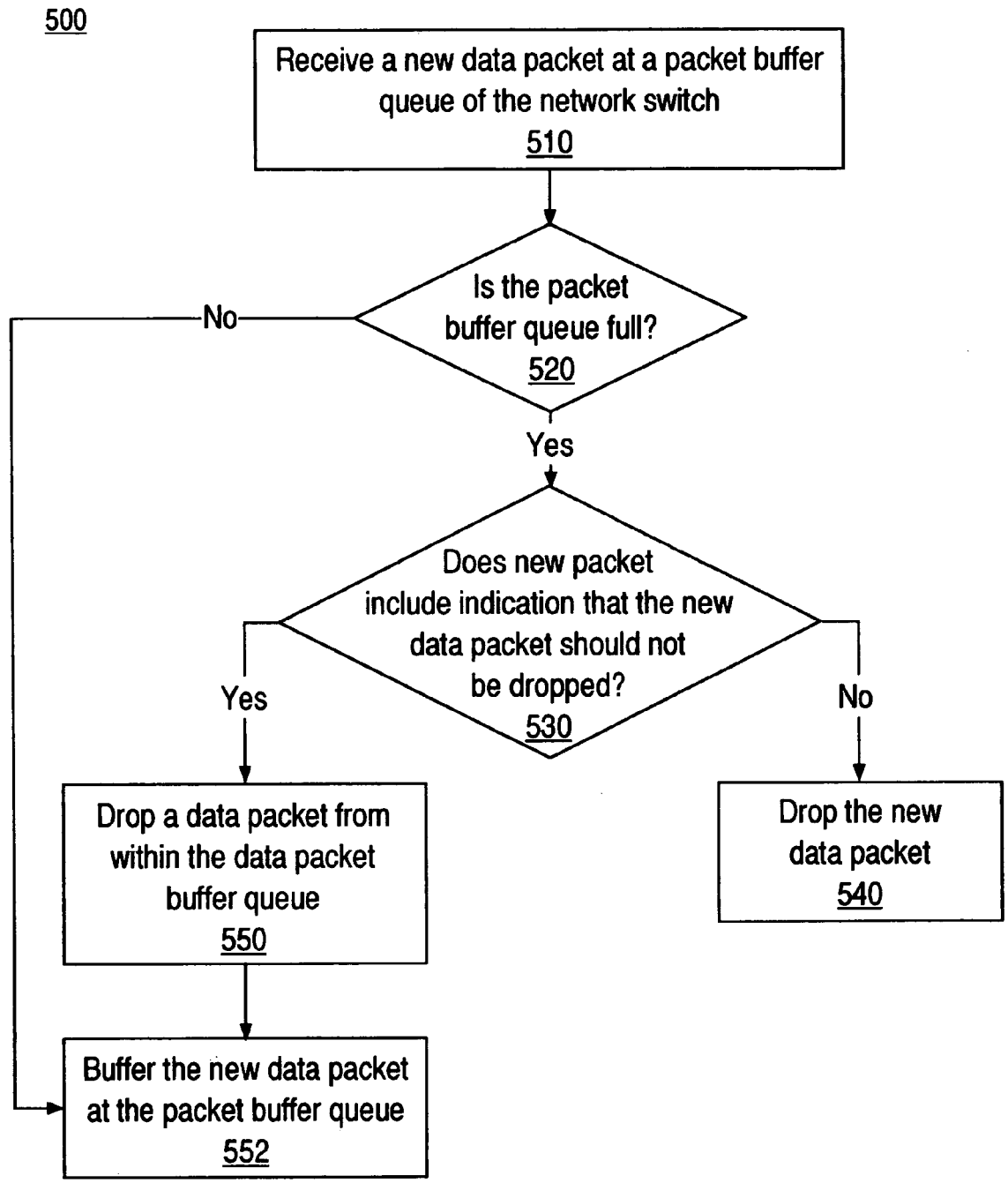
FIG. 5 is a flow chart illustrating a process of buffer management in a network device, in accordance with another embodiment of the present invention.

FIG. 5 is a flow chart illustrating a process 500 of buffer management in a network device, in accordance with another embodiment of the present invention. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in process 500, such steps are examples. That is, the embodiments of the present invention are well suited to performing various other steps or variations of the steps recited in FIG. 5. In one embodiment, process 500 is performed by network device 100 of FIG. 1.

At step 510 of process 500, a new data packet (e.g., new packet 105 of FIG. 1) is received at a packet buffer queue (e.g., packet buffer queue 120 of FIG. 1) of a network switch. In one embodiment, the new data packet is a portion of a burst block.

At step 520, it is determined whether the packet buffer queue is full. In one embodiment, this determination is based on whether the amount of data in the packet buffer queue exceeds a threshold. For example, when the amount of data, e.g. number of packets, exceeds a threshold, the packet buffer queue is determined to be full. It should be appreciated that the packet buffer queue need not be completely full for a determination that the packet buffer queue is full. In another embodiment, the packet buffer queue is determined to be full if there is no room to receive additional packets. If it is determined that the packet buffer queue is not full, process 500 proceeds to step 552, where the new data packet is buffered at the packet buffer queue. Alternatively, if it is determined that the packet buffer queue is full, process 500 proceeds to step 530.

At step 530, it is determined whether the new data packet includes an indication that the data packet should not be dropped from the packet buffer queue. In one embodiment, the indication is a push bit indication. If it is determined that the new data packet does not include an indication that the new data packet should not be dropped, process 500 proceeds to step 540. Alternatively, if it is determined that the new data packet includes an indication that the new data packet should not be dropped, process 500 proceeds to step 550.

At step 540, the new data packet is dropped because the data packet does not include an indication that the data packet should not be dropped from the packet buffer queue.

At step 550, a data packet or packets from within the packet buffer queue is dropped. In one embodiment, the dropped data packet or packets are not the last sequential data packet(s) of a burst block. In one embodiment, step 550 is performed by a selective packet dropper of the network device, e.g., selective packet dropper 130 of FIG. 1).

In various embodiments, step 550 is performed according to the determination as to whether a packet is dropped is based on the contents of the data packet itself. In one embodiment, step 550 is performed according to process 400 of FIG. 4, as described above.

In other various embodiments, a determination is made whether the data packet or packets are the last sequential data packet(s) of a burst block based on a position of the data packet(s) within the packet buffer queue. In one embodiment, the last sequential data packet or packets (e.g., packet 115n of FIG. 1) is dropped from within the packet buffer queue. In another embodiment, the second from last sequential data packet or packets (e.g., packet 115m of FIG. 1) is dropped from within the packet buffer queue. In another embodiment, the first sequential data packet or packets (e.g., packet 115a of FIG. 1) is dropped from within the packet buffer queue. It should be appreciated that embodiments of the present invention are not limited to the described embodiments, and that any sequential position can be used for selecting a packet or packets to drop.

With reference to FIG. 5, in one embodiment of the present invention shown at step 552, the new data packet is buffered at the packet buffer queue.

In summary, various embodiments of the present invention provide for selectively dropping a packet from a packet buffer queue of a network device. In one embodiment, the present invention attempts to not drop packets from the packet buffer queue that decrease the performance of the network to applications sending burst blocks, such as packets at the end of a burst block. In various embodiments, the determination as to whether a packet is dropped is based on the sequential position of the packet within the packet buffer queue. In other various embodiments, the determination as to whether a packet is dropped is based on the contents of the packet itself. Since network performance, such as SMB over TCP/IP performance, is particularly sensitive to the last packet or packets of a burst block being dropped, embodiments of the present invention provide for reducing the chance that the final packet(s) of a burst are dropped. By dropping those packets that do not severely detrimentally impact network performance, the described embodiments provide improved network performance over previous packet dropping techniques.

Various embodiments of the present invention, a method of buffer management in a network device, are described herein. While the embodiments of the present invention have been described in particular embodiments, it should be appreciated that embodiments of the present invention should not be construed as limited by such embodiments, but rather construed according to the following claims.

What is claimed is:

1. A method of buffer management in a network device, the method comprising:
   receiving a new data packet at a packet buffer queue of the network switch, wherein the new data packet is a portion of a burst block; and
   if the packet buffer queue is full, dropping a data packet from within the packet buffer queue wherein the data packet is selected and dropped based on a sequential placement of the data packet within the packet buffer queue and is not a last sequential data packet of the burst block, and wherein the selecting of the data packet further comprises selecting the data packet that does not require a timeout to request that the data packet be resent when dropped.

2. The method as recited in claim 1 further comprising buffering the new data packet at the packet buffer queue.

3. The method as recited in claim 1 wherein the dropping a data packet from within the packet buffer queue that is not a last sequential data packet of a burst block comprises dropping a last sequential data packet from within the packet buffer queue.

4. The method as recited in claim 1 wherein the dropping a data packet from within the packet buffer queue that is not a last sequential data packet of a burst block comprises dropping a second from last sequential data packet from within the packet buffer queue.

5. The method as recited in claim 1 wherein the dropping a data packet from within the packet buffer queue that is not a last sequential data packet of a burst block comprises dropping a first sequential data packet from within the packet buffer queue.

6. The method as recited in claim 1 wherein the dropping a data packet from within the packet buffer queue that is not a last sequential data packet of a burst block comprises:
   selecting a data packet from within the packet buffer queue;
   determining whether the data packet comprises an indication that the data packet should not be dropped from the packet buffer queue; and
   dropping the data packet if the data packet does not comprise an indication that the data packet should not be dropped from the packet buffer queue.

7. The method as recited in claim 6 wherein the selecting a data packet from within the packet buffer queue comprises randomly selecting a data packet from within the packet buffer queue.

8. The method as recited in claim 6 wherein the selecting a data packet from within the packet buffer queue comprises selecting a data packet from within the packet buffer queue according to a predetermined sequence.

9. The method as recited in claim 6 wherein the indication is a push bit indication.

10. A network device comprising:
    a packet buffer queue for buffering a plurality of data packets;
    a network interface communicatively coupled to the packet buffer queue and configured to receive a new data packet, wherein the new data packet is a portion of a burst block; and
    a selective packet dropper configured to drop a data packet of the plurality of data packets wherein the data packet is selected and dropped based on a sequential placement of the data packet within the packet buffer queue and is not a last sequential data packet of the burst block if the packet buffer queue is full, and wherein the selective packet dropper is configured to select the data packet that does not require a timeout to request that the data packet be resent when dropped.

11. The network device as recited in claim 10 wherein the selective packet dropper is configured to select a data packet from within the packet buffer queue, is configured to determine whether the data packet comprises an indication that the data packet should not be dropped from the packet buffer queue, and is configured to drop the data packet if the data packet does not comprise an indication that the data packet should not be dropped from the packet buffer queue.

12. The network device as recited in claim 11 wherein the selective packet dropper randomly selects a packet from within the packet buffer queue.

13. The network device as recited in claim 11 wherein the selective packet dropper selects a packet from within the packet buffer queue according to a predetermined sequence.

* * * * *